United States Patent
Binzer

(10) Patent No.: US 9,812,787 B2
(45) Date of Patent: Nov. 7, 2017

(54) COMBINATION OF RADAR SENSOR AND TRIM COMPONENT FOR A MOTOR VEHICLE

(71) Applicant: Robert Bosch GmbH, Stuttgart (DE)

(72) Inventor: Thomas Binzer, Ingersheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 541 days.

(21) Appl. No.: 14/516,299

(22) Filed: Oct. 16, 2014

(65) Prior Publication Data
US 2015/0109162 A1    Apr. 23, 2015

(30) Foreign Application Priority Data
Oct. 17, 2013   (DE) .................. 10 2013 221 055

(51) Int. Cl.
| | |
|---|---|
| *H01Q 15/14* | (2006.01) |
| *G01S 13/02* | (2006.01) |
| *H01Q 1/32* | (2006.01) |
| *H01Q 1/42* | (2006.01) |
| *G01S 13/93* | (2006.01) |
| *G01S 7/02* | (2006.01) |

(52) U.S. Cl.
CPC .............. *H01Q 15/14* (2013.01); *G01S 13/02* (2013.01); *G01S 13/931* (2013.01); *H01Q 1/3233* (2013.01); *H01Q 1/422* (2013.01); *G01S 2007/027* (2013.01); *G01S 2013/9389* (2013.01)

(58) Field of Classification Search
CPC ...... H01Q 15/14; H01Q 1/3233; H01Q 1/422; G01S 13/931; G01S 13/02; G01S 2013/9389; G01S 2007/027
See application file for complete search history.

(56) References Cited

U.S. PATENT DOCUMENTS

| | | | | |
|---|---|---|---|---|
| 5,508,706 | A * | 4/1996 | Tsou ..................... | B60Q 1/0023 342/110 |
| 5,512,901 | A * | 4/1996 | Chen ...................... | G01S 7/032 342/175 |
| 6,239,757 | B1 * | 5/2001 | Ishikawa ................ | G01S 7/032 343/711 |
| 7,009,551 | B1 * | 3/2006 | Sapletal ................. | G01S 7/025 342/70 |
| 8,018,375 | B1 * | 9/2011 | Alexopoulos .......... | H01Q 19/10 342/175 |
| 9,653,807 | B2 * | 5/2017 | Binzer .................. | H01Q 9/0414 |

(Continued)

FOREIGN PATENT DOCUMENTS

| | | | | |
|---|---|---|---|---|
| JP | 2005020769 | A | * 1/2005 | ............. B29C 45/16 |
| JP | 2006105866 | A | * 4/2006 | |

(Continued)

*Primary Examiner* — John B Sotomayor
(74) *Attorney, Agent, or Firm* — Norton Rose Fulbright US LLP; Gerard Messina

(57) ABSTRACT

A combination of a radar sensor and a trim component, which are to be mounted on a motor vehicle so that the trim component is penetrated by microwaves of the radar sensor, the trim component including at least one layer, which reflects a portion of the microwaves, the trim component including an additional layer, which is configured based on thickness and dielectric constant to reduce the reflection.

10 Claims, 2 Drawing Sheets

(56) References Cited

U.S. PATENT DOCUMENTS

| | | | |
|---|---|---|---|
| 2002/0067305 A1* | 6/2002 | LeBlanc | B60K 31/0008 342/198 |
| 2003/0128155 A1* | 7/2003 | Sasada | H01P 11/008 342/175 |
| 2003/0151541 A1* | 8/2003 | Oswald | B60R 21/01538 342/70 |
| 2004/0227663 A1* | 11/2004 | Suzuki | G01S 7/03 342/70 |
| 2005/0062660 A1* | 3/2005 | Henderson | H01Q 1/3233 343/754 |
| 2005/0168374 A1* | 8/2005 | Kamiya | B60R 11/02 342/1 |
| 2006/0022866 A1* | 2/2006 | Walton | G01S 7/352 342/194 |
| 2006/0197701 A1* | 9/2006 | Heide | G01S 7/032 342/118 |
| 2006/0256026 A1* | 11/2006 | Gotzig | G01S 7/032 343/818 |
| 2006/0262003 A1* | 11/2006 | Kamiya | B32B 15/08 342/5 |
| 2006/0284335 A1* | 12/2006 | Fujii | B29C 45/1671 264/255 |
| 2009/0102700 A1* | 4/2009 | Kato | G01S 7/4008 342/173 |
| 2012/0119961 A1* | 5/2012 | Mayer Pujadas | B60R 13/005 343/713 |
| 2014/0049427 A1* | 2/2014 | Keckes | H01Q 1/3233 342/385 |
| 2014/0091969 A1* | 4/2014 | Shi | G01S 13/931 342/385 |
| 2014/0159942 A1* | 6/2014 | Shi | G01S 13/867 342/55 |
| 2015/0084803 A1* | 3/2015 | Purden | H01Q 1/3283 342/1 |
| 2015/0097730 A1* | 4/2015 | Pontes | G01S 7/02 342/385 |
| 2015/0109162 A1* | 4/2015 | Binzer | H01Q 1/3233 342/5 |
| 2016/0064806 A1* | 3/2016 | Geary | H01Q 1/3233 343/713 |

FOREIGN PATENT DOCUMENTS

| | | |
|---|---|---|
| JP | 2015137877 A | * 7/2015 |
| KR | 100783578 B1 | * 12/2007 |

* cited by examiner

COMBINATION OF RADAR SENSOR AND TRIM COMPONENT FOR A MOTOR VEHICLE

RELATED APPLICATION INFORMATION

The present application claims priority to and the benefit of German patent application no. 10 2013 221 055.8, which was filed in Germany on Oct. 17, 2013, the disclosure of which is incorporated herein by reference.

FIELD OF THE INVENTION

The present invention relates to a combination of a radar sensor and a trim component, which are to be mounted on a motor vehicle in such a way that the trim component is penetrated by microwaves of the radar sensor, the trim component including at least one layer which reflects a portion of the microwaves.

BACKGROUND INFORMATION

Radar sensors are increasingly used in motor vehicles, which serve to detect the surrounding traffic in order to furnish data for various driver assistance functions, for example, for adaptive cruise control or for a lane change assistant.

Frequently, it is desirable to install the radar sensor hidden behind a trim component, for example, a bumper of the motor vehicle. In such a case, however, it must be expected that a portion of the microwaves which penetrate the bumper are reflected on this bumper, thereby reducing the performance and, therefore, the range of the radar sensor. More importantly, the waves reflected on the bumper and received back by the radar sensor for the evaluation of the actual radar signal form an interfering signal. This makes it more difficult, particularly in the case of angle-resolving radar sensors, to measure the angular position of the located radar targets.

In the case of plastic bumpers made homogeneously of a uniform material, it is possible to design the thickness of the plastic wall forming the bumper in such a way that the reflected waves are largely eliminated as a result of resonance effects and interference effects. Such a design is impracticable, however, in the case of trim components having a multilayer structure, for example, in the case of painted bumpers.

SUMMARY OF THE INVENTION

An object of the present invention, therefore, is to provide a combination of radar sensor and trim component, in which the reflection of the microwaves is reduced, in particular also in trim components which have a multilayer structure.

This object may be achieved in that the trim component includes an additional layer, which is configured based on thickness and dielectric constant to reduce the reflection.

Thus, the present invention allows the bumper itself (without the additional layer) to be configured solely in terms of the properties normally required of bumpers, such as deformation properties, appearance and the like, without, in the event the bumper is used in combination with a radar sensor, having to take into account the reflection behavior, which is also a function of the wavelength of the microwaves and, therefore, of the operating frequency of the respective radar sensor. In order to then optimize the bumper in terms of its use in combination with a radar sensor, the additional layer is then applied, the function of which is to modify the reflection properties and, in particular, to ensure that the waves reflected on the reflecting layer of the trim component destructively interfere with the waves reflecting on the additional layer, to thereby ensure a reduction of the reflection as a whole.

Advantageous embodiments of the present invention are specified in the description herein.

The additional layer may be formed, for example, by additionally attaching a molded part to the bumper or by a film, for example, a PVC film. Particularly advantageous is the use of multiple film layers, which allows the overall thickness of the additional layer to be varied if needed by suitably selecting the number of film layers.

In a trim component for motor vehicles, the strongest reflecting layer is usually formed by a coat of varnish on the exterior of the trim component. The additional layer may then be applied to the opposite side of the trim component.

In a trim component having a multilayer structure, the optimal combination of thickness and dielectric constant of the additional layer is in principle a function of the thickness and of the dielectric constants of all the other layers of the trim component. In practice, however, the effect of individual layers of the trim component may often be disregarded, so that the optimal selection depends on a smaller number of parameters.

The subject matter of the present invention is also a motor vehicle having the above described combination of radar sensor and trim component, and a method for manufacturing a trim component for motor vehicles.

Exemplary embodiments are explained in greater detail below with reference to the drawings.

DETAILED DESCRIPTION

Figure 1:
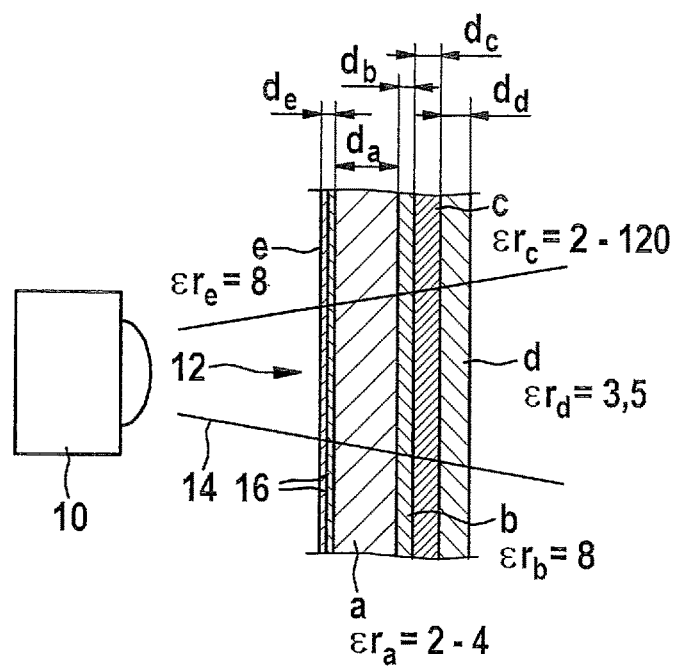
FIG. 1 schematically shows a view of a radar sensor in combination with a trim component, of which only one wall section is depicted in cross section.

FIG. 1 schematically shows a radar sensor 10, which is situated a certain distance behind a trim component 12, namely, a bumper of a motor vehicle, so that microwaves 14 emitted from radar sensor 10 are forced to penetrate bumper 12. Radar sensor 10 is, for example, a 77 GHz radar, so that the wavelength of microwaves 14 lies approximately in the range of 4 mm.

Trim component 12 has a layer structure which is not represented to scale in the drawing, and includes a base body a made of plastic having a typical thickness $d_a$ of 2.8 mm, to which, in order, a primer layer b having a thickness of typically approximately 10 µm, a base coat of varnish c having a thickness $d_c$ of typically approximately 20 µm, and finally a clear coat of varnish d having a thickness $d_d$ of typically approximately 30 µm are applied to the side facing away from radar sensor 10.

The dielectric constant (relative dielectric constant) $\in r_a$ of the plastic material of the base body a is typically between 2 and 4. Primer layer b typically has a dielectric constant $\in r_b$ of 8, and clear coat of varnish d typically has a dielectric constant $\in r_d$ of 3.5. Dielectric constant $\in r_c$ of base coat of varnish c may assume values of up to 120. The level of this dielectric constant $\in r_c$ is dependent on the desired visual properties and assumes very high values, particularly in the case of varnishes having a metallic effect.

For microwaves 14, any boundary surface on which the dielectric constant and, therefore, the optical density of the medium changes, represents, in principle, a reflecting surface on which a portion of the incident radiation is reflected. In the layer structure shown herein, base coat of varnish c in particular, acts as a reflecting surface due to its high dielectric constant, i.e., particularly strong reflections occur at the boundary surfaces, which this layer forms with primer layer b and clear coat of varnish d. The microwaves which are reflected at the various boundary surfaces of the bumper overlap one another and may interfere with one another constructively or destructively, depending on the thickness of the layers and pairing of the dielectric constants at the boundary surfaces. These interference effects ultimately determine the reflection coefficient, which trim component 12 as a whole exhibits for microwaves 14.

Figure 2:
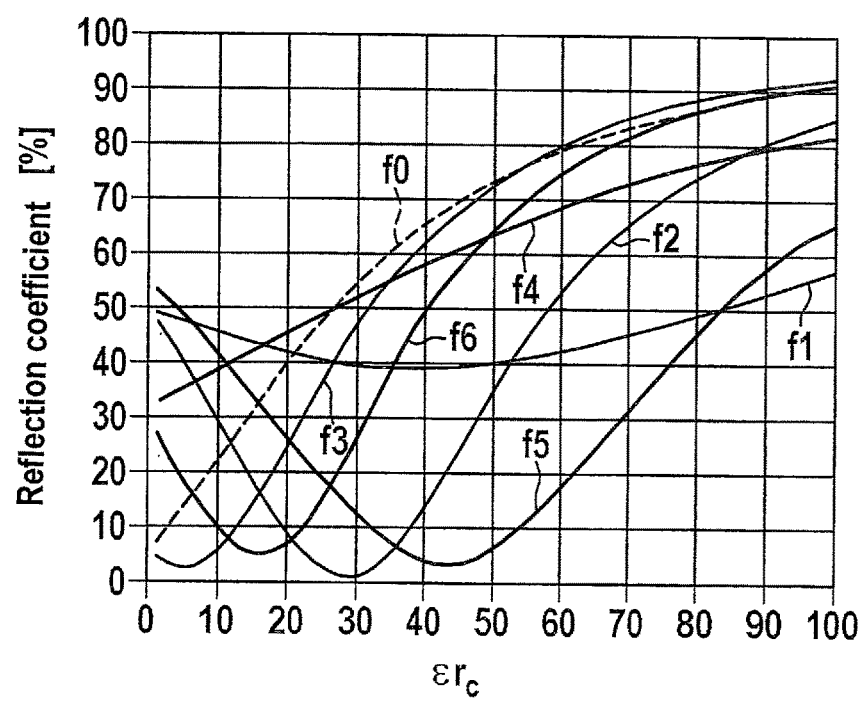
FIG. 2 shows a diagram which indicates the reflection coefficient for different thicknesses of an additional layer of the trim component shown in FIG. 1 as a function of the dielectric constant of a coat of varnish of this trim component.

In FIG. 2 a dash-lined curve f0 shows the reflection coefficient of a trim component made up only of layers a, b, c, and d in FIG. 1 as a function of dielectric constant $\in r_c$ of base coat of varnish c. It apparent that the reflection coefficient increases sharply with increasing dielectric constant of the base coat of varnish and may even amount to more than 90% in the case of dielectric constants greater than 100.

The reflections are mitigated as a result of an additional layer e included in trim component 12 shown in FIG. 1 on the side of the base body a facing radar sensor 10, which forms additional reflection surfaces, and thereby alters the interference pattern. In the example shown in FIG. 1, additional layer e is made up of two plies of a film 16, for example, a PVC film having dielectric constant $\in r_e=8$ and a thickness of 200 µm. The overall thickness $d_e$ of additional layer e is therefore 400 µm.

The reflection coefficient, which results in the presence of this additional layer e, is depicted as curve f2 in FIG. 2. It is apparent that at approximately $\in r_c=30$, this curve has a distinct minimum, so that the reflection on the trim component is almost completely suppressed when the base coat of varnish c has a dielectric constant close to 30.

Varying the number of plies of film in additional layer e (in which the thickness and dielectric constant of individual film 16 is unchanged) allows the reflection behavior for different dielectric constants $\in r_c$ to be adapted to base coat of varnish 10, as is illustrated by the other curves in FIG. 2. In the case of just one ply of film 16, a reflection coefficient results, which is indicated by curve f1. This curve does not have such a distinct minimum, but it is very flat and thus remains below 60%, even in the case of high values of $\in r_c$. This additional layer is, therefore, a good choice in conjunction with base coats of varnish which have very high dielectric constants.

In the case of an additional layer e having three plies of film 16, a reflection coefficient is obtained, whose curve f3 resembles the curve for f2, but which has a minimum of approximately $\in r_c=5$. In the case of four plies, the reflection coefficient is described by a curve f4, which is also comparatively flat, but exhibits no distinct minimum. Curve f5 indicates the reflection coefficients for five plies and has a minimum of between 40 and 50, and curve f6 indicates the reflection coefficient for six plies and has a minimum of between 10 and 20.

In this way, for each given dielectric constant $\in r_c$ of base coat of varnish c, the number of plies of film 16 may be selected in such a way that a minimizing of the reflection coefficient is achieved by additional layer e. It should be noted here, however, that because of the periodic nature of the microwaves, there is no simple relationship between dielectric constant $\in r_c$ of the base coat of varnish and optimum thickness $d_e$ of additional layer e, so that the optimum thickness of the additional layer must be calculated or empirically ascertained in individual cases.

To a certain extent, the diagram shown in FIG. 2 is also affected by the thicknesses and electric constants of layers a, b and d, so that a different diagram is obtained for each combination of parameters $d_a$, $d_b$, $d_d$, $\in r_a$, $\in r_b$ and $\in r_d$. The effect of layers b and d, however, will be negligible in many cases, so that the number of parameters to be taken into account is correspondingly reduced.

Of course, dielectric constant $\in r_e$ of film 16 also affects the appearance of the diagram in FIG. 2. Thus, instead of varying thickness $d_e$ of additional layer e, it is also possible, given a constant thickness, to vary the material of this layer and, therefore, dielectric constant $\in r_e$, and then, based on the diagram, to select the dielectric constant $\in r_e$, which shows the smallest reaction coefficient for given base coat of varnish c.

Of course, it is also possible in additional layer e to combine films with one another, which have a different thickness and/or different dielectric constants.

To manufacture a trim component optimized for use in conjunction with radar sensor 10, it is possible in general to proceed as follows.

For a trim component having n layers (including additional layer e), a set of 2n variables is obtained, namely, the layer thicknesses and the dielectric constants of these layers. In principle, all of these variables may be varied independently of one another. For a radar sensor having a given operating frequency and, accordingly, microwaves of a given wavelength, the reflection coefficient may then be calculated or, if necessary, empirically ascertained, as a function of the 2n independent variables. The function thus obtained will, in general, have multiple local minimums. For some of the independent variables, certain limitations will apply. This applies, in particular, to thickness $d_a$ of the base body and, if a particular color of varnish is desired, to dielectric constant $\in r_c$ of the base coat of varnish. Taking these limitations into account, the lowest local medium may then be sought and a trim component with the corresponding layer structure may be manufactured.

The complexity may be significantly reduced by treating some of the 2n variables as fixed parameters, for example, the layer thicknesses and the dielectric constants of layers a, b and d and, if necessary, also layer thickness $d_c$ of the base coat of varnish, as well as dielectric constant $\in r_e$ of additional layer e, so that the task is reduced to seeking the minimum of a function in two variables ($\in r_c$ and $d_e$).

By minimizing the reflection coefficient, it is possible, in particular, in the case of an angle-resolving radar sensor 10, to improve the accuracy of the angle measurement. This is illustrated by the diagrams shown in FIGS. 3 and 4.

Figure 3:
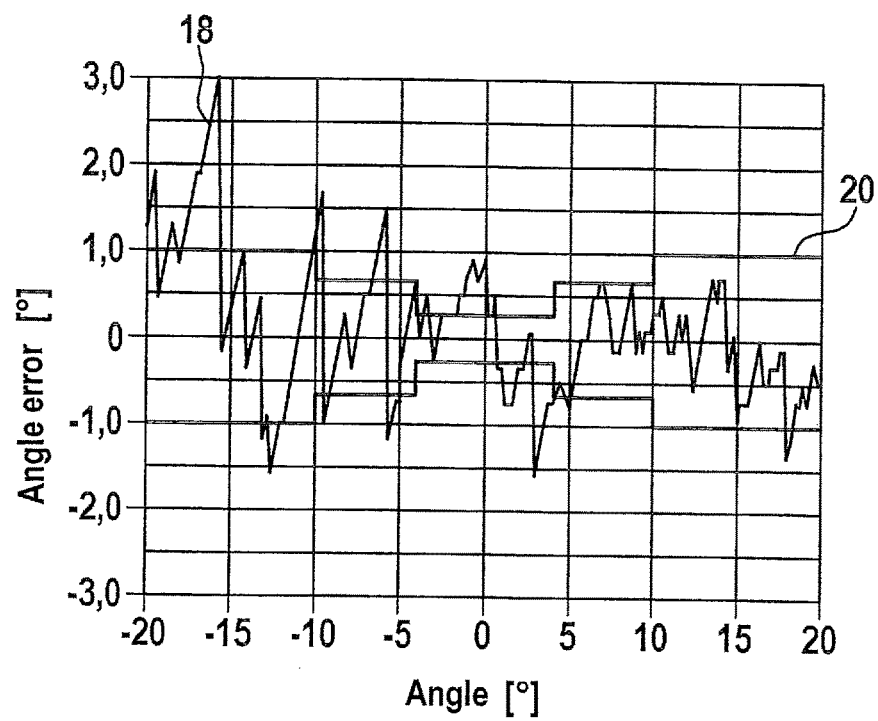
FIG. 3 shows an error diagram, which indicates the angle error for angle measurements with the radar sensor according to FIG. 1 in combination with a conventional bumper with no additional layer as a function of the location angle.

In FIG. 3, a curve 18 indicates the error occurring in the angle measurement of an individual object as a function of the angle for the case in which trim component 12 has the layer structure shown in FIG. 1 without additional layer e. Also depicted in FIG. 3 is an admissible tolerance range 20. It is apparent that the error often clearly exceeds the admissible tolerances.

Figure 4:
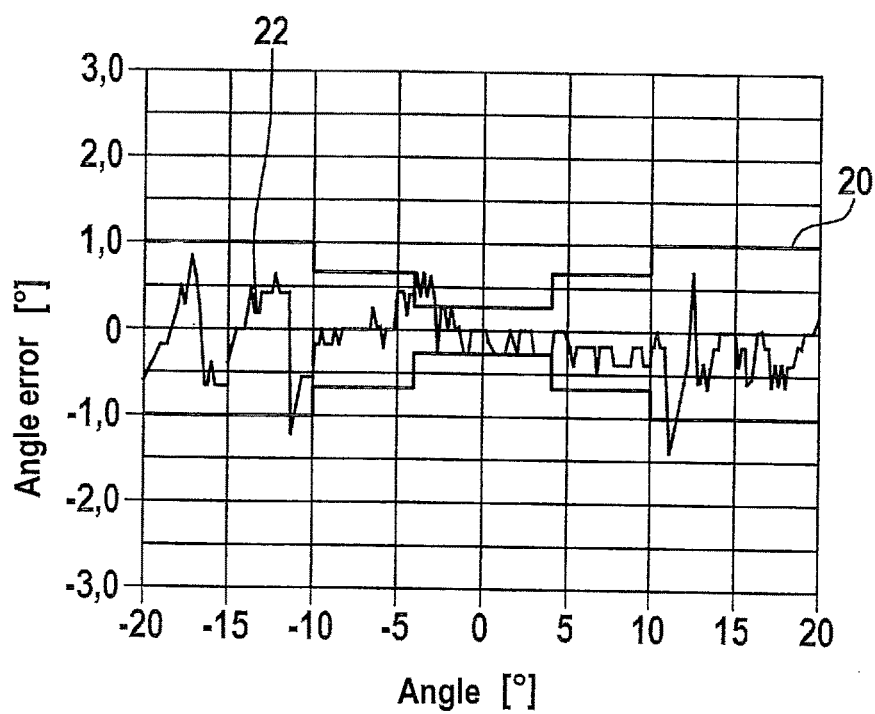
FIG. 4 shows an error diagram for the radar sensor in combination with a bumper according to the present invention.

In FIG. 4, a curve 22 shows the corresponding results for the case in which trim component 12 includes additional layer e. The angle error is reduced considerably as a result and lies largely within tolerance range 20.

What is claimed is:

1. A system, comprising:
    a combination of a radar sensor and an external trim component, which are mountable on a motor vehicle so that the external trim component is penetrate-able by microwaves of the radar sensor, the external trim component including at least one layer on an outer surface of a base body of the external trim component, the outer surface facing away from the radar sensor, the at least one layer reflecting a portion of the microwaves;
    wherein the external trim component includes an additional layer on an inner surface of the base body of the external trim component, the inner surface facing the radar sensor, and
    wherein the additional layer is configured based on a thickness and a dielectric constant to reduce the reflecting of the portion of the microwaves.

2. The system of claim 1, wherein the external trim component is a bumper.

3. The system of claim 1, wherein the reflecting layer and the additional layer are situated on opposite sides of a base body of the external trim component.

4. The system of claim 1, wherein the additional layer contains at least one ply of film.

5. The system of claim 4, wherein the additional layer contains multiple plies of the film.

6. A motor vehicle system, comprising:
    a motor vehicle; and
    a combination of a radar sensor and an external trim component, which are mountable on a motor vehicle so that the external trim component is penetrate-able by microwaves of the radar sensor, the external trim component including at least one layer on an outer surface of a base body of the external trim component, the outer surface facing away from the radar sensor, the at least one layer reflecting a portion of the microwaves;
    wherein the external trim component includes an additional layer on an inner surface of the base body of the external trim component, the inner surface facing the radar sensor, and
    wherein the additional layer is configured based on a thickness and a dielectric constant to reduce the reflecting of the portion of the microwaves.

7. A method for manufacturing an external trim component for a motor vehicle for use in combination with a radar sensor, which is situated on the motor vehicle so that microwaves of the radar sensor are able to penetrate the external trim component, the method comprising:
    providing a base body of the external trim component, the base body having at least one layer on an outer surface of the base body of the external trim component, the outer surface facing away from the radar sensor, the at least one layer being configured to reflect a portion of the microwaves, the base body and each layer of the at least one layer having a certain thickness and a certain dielectric constant;
    ascertaining a reflection coefficient curve for the external trim component, which is formed by the base body, the at least one layer, and an additional layer as a function of at least one independent variable, which indicates the thickness of the additional layer;
    determining an optimum thickness of the additional layer based on the reflection coefficient curve; and
    applying the additional layer having the optimum thickness.

8. The system of claim 1, wherein the base body is plastic, and wherein the at least one layer includes a primer layer, a layer of a base coat of varnish, and a layer of a clear coat of varnish.

9. The system of claim 1, wherein the additional layer includes at least one ply of a polyvinyl chloride (PVC) film.

10. The system of claim 9, wherein the at least one ply of the polyvinyl chloride (PVC) film has a dielectric constant of about 8 and a thickness of about 200 μm.

* * * * *